(12) United States Patent
Masuda et al.

(10) Patent No.: US 8,055,421 B2
(45) Date of Patent: Nov. 8, 2011

(54) BRAKING CONTROL DEVICE

(75) Inventors: Yoshio Masuda, Tokai (JP); Masayuki Naito, Takahama (JP); Hiroaki Niino, Toyota (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 576 days.

(21) Appl. No.: 12/174,323

(22) Filed: Jul. 16, 2008

(65) Prior Publication Data

US 2009/0024291 A1   Jan. 22, 2009

(30) Foreign Application Priority Data

Jul. 18, 2007   (JP) ................................. 2007-187166

(51) Int. Cl.
  *G06F 7/70*   (2006.01)
  *G06G 7/00*   (2006.01)
  *G06G 7/76*   (2006.01)
(52) U.S. Cl. ....................... 701/70; 303/114.1
(58) Field of Classification Search .................... 701/70; 188/137–138, 152, 354–360; 303/114.1–114.3, 303/115.1–115.6; 180/414, 415
  See application file for complete search history.

(56) References Cited

U.S. PATENT DOCUMENTS 7,140,699 B2 * 11/2006 Gronau et al. ............. 303/113.4
  2004/0181381 A1 * 9/2004 Matsuhashi ........................ 703/7
  2008/0305932 A1 * 12/2008 Karnjate et al. ............... 477/184

FOREIGN PATENT DOCUMENTS

JP        2006-192945 A    7/2006

\* cited by examiner

*Primary Examiner* — Jack Keith
*Assistant Examiner* — Rami Khatib
(74) *Attorney, Agent, or Firm* — Buchanan Ingersoll & Rooney PC

(57) ABSTRACT

It is an object of the present invention to minimize any sensation of inadequate firmness and large changes in deceleration rate with respect to a change in a brake operation force when the force exceeds a boost limit point. A first correlation S1 when a brake operation force increases and a second correlation S2 after hysteresis is applied at the time of a decrease in the brake operation force are taken as relationships between a brake operation force F and a wheel cylinder pressure PWC in a state wherein an assist hydraulic pressure PA is not applied. An assist hydraulic pressure control section controls the assist hydraulic pressure PA so that when a brake operation force that exceeds a boost limit point T1 is applied, the assist hydraulic pressure PA is added, hysteresis is applied when the brake operation force decreases, the assist hydraulic pressure PA decreases, and the relationship between the wheel cylinder pressure PWC and the brake operation force F when the assist hydraulic pressure PA decreases to zero becomes the second correlation S2.

5 Claims, 6 Drawing Sheets

BRAKING CONTROL DEVICE

BACKGROUND OF THE INVENTION

1. Field of the Invention

The present invention relates to a braking control device having an assist hydraulic pressure control section that adds an assist hydraulic pressure to a master cylinder hydraulic pressure. The pressure is added on the application of a brake operation force that exceeds the boost limit point at which the booster device becomes unable to amplify the brake operation force at the prescribed boost ratio.

2. Description of the Related Art

With the above type of braking control device, the master cylinder generates the master cylinder hydraulic pressure as a result of the force produced as a result of the brake operation force being amplified by a booster device, and the master cylinder hydraulic pressure is applied to each wheel cylinder. However, when the applied brake operation force exceeds the boost limit point at which the booster device becomes unable to amplify the brake operation force at the prescribed boost ratio, the master cylinder hydraulic pressure is insufficient relative to the target wheel cylinder pressure.

Thus, when a brake operation force that exceeds the boost limit point is applied, the assist hydraulic pressure control section calculates an assist hydraulic pressure to be added to the master cylinder hydraulic pressure based on data detected by a brake operation force detection sensor, and the assist hydraulic pressure is added to the master cylinder hydraulic pressure (e.g., refer to patent document 1).

FIG. 7 shows a relationship between a brake operation force F and a wheel cylinder pressure PWC for a conventional braking control device. The change in a master cylinder hydraulic pressure PMC when a brake operation force that exceeds the boost limit point T1 is applied is represented by a dotted line in the drawing.

When a brake operation force that has not reached the boost limit point T1 is applied, the assist hydraulic pressure is not added. At this time, the relationship between the brake operation force and the wheel cylinder pressure has a first correlation S1 when the brake operation force is increasing, a second correlation S2 after hysteresis is applied when the brake operation force is decreasing, and an intermediate correlation S3 that connects between the first correlation S1 and second correlation S2. The intermediate correlation S3, for example, is configured so that the wheel cylinder pressure decreases more gradually than in the first correlation S1.

A configuration is produced whereby, when the brake operation force decreases during the first correlation S1, the wheel cylinder pressure decreases in the same relationship as the relationship of the decrease in wheel cylinder pressure with respect to the decrease in the brake operation amount in the intermediate correlation S3, whereupon the wheel cylinder pressure decreases based on the second correlation S2. A configuration is produced whereby, when the brake operation force increases during the second correlation S2, the wheel cylinder pressure is kept constant, whereupon the wheel cylinder pressure increases based on the first correlation S1.

When a brake operation force that exceeds the boost limit point T1 is applied, the assist hydraulic pressure control section first determines the target the wheel cylinder pressure PWC, calculates the assist hydraulic pressure PA based on the difference between the wheel cylinder pressure PWC and the master cylinder hydraulic pressure PMC that has been determined, and then adds this calculated assist hydraulic pressure PA. As regards control of the assist hydraulic pressure, when the brake operation force is increasing, the assist hydraulic pressure control section controls the assist hydraulic pressure based on a first correlation extension section S1a produced by an extension of the first correlation S1 so that the relationship between the brake operation force and the wheel cylinder pressure is kept in the first correlation S1. In addition, when the brake operation force is decreasing, as when the brake operation force is increasing, the assist hydraulic pressure control section controls the assist hydraulic pressure based on the first correlation extension section S1a produced by extension of the first correlation S1 so that the relationship between the brake operation force and the wheel cylinder pressure is kept in the first correlation S1.

[Patent document 1] JP (Kokai) 2006-192945

With the above conventional braking control device, the relationship between the brake operation force and the wheel cylinder pressure when the brake operation force switches from increasing to decreasing is different from when a brake operation force that exceeds the boost limit point T1 is applied when a brake operation force that is below the boost limit point T1 is applied. When a brake operation force that exceeds the boost limit point T1 is applied, the first correlation extension section S1a applies, whereas when a brake operation force that is below the boost limit point T1 is applied, the intermediate correlation S3 applies, with the wheel cylinder pressure decreasing more gradually than in the first correlation S1. Consequently, when the brake operation force switches from increasing to decreasing due to a fluctuation in the brake operation force or another reason, the wheel cylinder pressure varies more when a brake operation force that exceeds the boost limit point T1 is applied than when a brake operation force that is below the boost limit point T1 is applied. For this reason, when a brake operation force that exceeds the boost limit point T1 is applied, the wheel cylinder pressure tends to change more quickly with respect to changes in the brake operation force, and the firmness with respect to changes in brake operation force may be insufficient.

In addition, with conventional braking control devices, when the brake operation force decreases in a situation where a brake operation force exceeding the boost limit point T1 is applied, the relationship between the brake operation force and the wheel cylinder pressure will adhere to the first correlation extension section S1a until the assist hydraulic pressure is released, to the intermediate correlation S3 after the assist hydraulic pressure has been released, and to the second correlation S2 thereafter. Consequently, the relationship of the decrease in wheel cylinder pressure with respect to the decrease in brake operation force will change before and after the assist hydraulic pressure is released, and will also change after the assist hydraulic pressure has been released, which causes significant alteration. For this reason, the operator may experience an unpleasant sensation as a result of the significant changes in deceleration rate.

SUMMARY OF THE INVENTION

The present invention was contrived in light of these problems, and it is an object thereof to provide a braking control device whereby it is possible to minimize any sensation of inadequate firmness with respect to changes in brake operation force when a brake operation force that exceeds the boost limit point is applied, while also minimizing large changes in deceleration rate.

In order to attain this objective, a first aspect of the braking control device according to the present invention is a braking control device comprising: a master cylinder for amplifying a brake operation force by using a booster device, and generating a master cylinder hydraulic pressure; a hydraulic circuit for applying the master cylinder hydraulic pressure to a wheel cylinder of each vehicle wheel; a brake operation force detection sensor for detecting the brake operation force; and an assist hydraulic pressure control section for calculating an assist hydraulic pressure to be added to the master cylinder hydraulic pressure based on detected information from the brake operation force detection sensor and for adding the assist hydraulic pressure to the master cylinder hydraulic pressure on the application of a brake operation force that exceeds a boost limit point at which the booster device becomes unable to amplify the brake operation force at a prescribed boost ratio; and having a first correlation at the time of an increase in the brake operation force, and a second correlation after hysteresis is applied at the time of a decrease in the brake operation force, as relationships between a wheel cylinder pressure applied to the wheel cylinder and the brake operation force in a state in which the assist hydraulic pressure is not applied; wherein the assist hydraulic pressure control section controls the assist hydraulic pressure so that when a brake operation force that exceeds the boost limit point is applied, the assist hydraulic pressure is added by the assist hydraulic pressure control section, hysteresis is applied at the time of a decrease in the brake operation force, the assist hydraulic pressure decreases, and the relationship between the wheel cylinder pressure and the brake operation force when the assist hydraulic pressure decreases to zero becomes the second correlation.

According to this aspect, when a brake operation force that exceeds the boost limit point is applied, hysteresis is added to the relationship between the brake operation force and the wheel cylinder pressure when the brake operation force decreases, so that the degree to which the wheel cylinder pressure changes with respect to the degree to which brake operation force changes will be reduced to a greater extent than when the brake operation force is increasing. Consequently, when a brake operation force that exceeds the boost limit point is applied, the amount of decrease in the wheel cylinder pressure with respect to the amount of decrease in brake operation force can be reduced when the brake operation force transitions from an increase to a decrease. As a result, when a brake operation force that exceeds the boost limit point is applied and the brake operation force transitions from an increase to a decrease due to fluctuation in brake operation force, it is possible to minimize significant changes in wheel cylinder pressure and to minimize any sensation of inadequate firmness with respect to changes in brake operation force.

In addition, according to the present aspect, when the brake operation force is decreasing and a brake operation force that exceeds the boost limit point is applied, the relationship between the brake operation force and the wheel cylinder pressure adheres to the second correlation when the assist hydraulic pressure is released, and this second correlation is maintained after the assist hydraulic pressure has been released. Consequently, the relationship of decreasing wheel cylinder pressure with respect to decreasing brake operation force can be changed smoothly before and after release of the assist hydraulic pressure and also can remain constant after the release of the assist hydraulic pressure. As a result, when a brake operation force that exceeds the boost limit point is applied, it possible to minimize significant changes in the deceleration rate as well as minimize significant variation in the relationship between the decrease in wheel cylinder pressure and the decrease in brake operation force.

In another aspect of the braking control device pertaining to the present invention the assist hydraulic pressure section controls the assist hydraulic pressure so that, when the assist hydraulic pressure decreases to zero, the assist hydraulic pressure decreases while the second correlation is maintained as the relationship between the brake operation force and the wheel cylinder pressure, whereupon the assist hydraulic pressure is reduced to zero.

According to this aspect, when a brake operation force that exceeds the boost limit point is applied and the brake operation force decreases, the relationship between the brake operation force and the wheel cylinder pressure adheres to the second correlation from before the assist hydraulic pressure is released. The assist hydraulic pressure is then released while the second correlation is maintained. Consequently, the relationship of the decrease in the wheel cylinder pressure with respect to the decrease in brake operation force can be constant before and after the assist hydraulic pressure is released, allowing the change in deceleration rate to be effectively minimized.

In another aspect of the braking control device of the present invention, the assist hydraulic pressure control section controls the assist hydraulic pressure so that, when a brake operation force that exceeds the boost limit point is applied, the first correlation is maintained as the relationship between the brake operation force and the wheel cylinder pressure when the brake operation force increases.

According to this aspect, when the brake operation force is increasing, regardless of whether the brake operation force exceeds the boost limit point, the relationship between the brake operation force and the wheel cylinder pressure is maintained in the first correlation. Consequently, it is possible to maintain a constant relationship between the increase in wheel cylinder pressure and the increase in the brake operation force before and after the assist hydraulic pressure is applied. As a result, it is possible to minimize significant changes in the deceleration rate when the brake operation force is increasing and a brake operation force that exceeds the boost limit point is applied.

In another aspect of the braking control device of the present invention, in the hysteresis applied by the assist hydraulic pressure control section, a relationship of a decrease in the wheel cylinder pressure with respect to a decrease in the brake operation force having the hysteresis is set to be equivalent to the relationship of the hysteresis applied when the brake operation force does not exceed the boost limit point.

According to this aspect, the relationship between the decrease in the wheel cylinder pressure and the decrease in the brake operation force with hysteresis included is the same relationship regardless of whether or not the brake operation force exceeds the boost limit point. Consequently, when a brake operation force that exceeds the boost limit point is applied or when a brake operation force that has not reached the boost limit point is applied, the operator can experience the same sensation of deceleration with respect to the brake operation force.

In another aspect of the braking control device of the present invention, a master cylinder hydraulic pressure detection sensor for detecting the master cylinder hydraulic pressure based on the brake operation force is provided as the brake operation force detection sensor.

Because the master cylinder hydraulic pressure changes in accordance with the brake operation force, it is possible to detect the master cylinder hydraulic pressure based on the brake operation force by using a master cylinder hydraulic pressure detection sensor. Consequently, a master cylinder hydraulic pressure detection sensor can be used in order to calculate the assist hydraulic pressure and in order to detect the master cylinder hydraulic pressure, allowing the configuration to be simplified.

In some configurations, a master cylinder hydraulic pressure detection sensor is already provided. Consequently, the assist hydraulic pressure can be calculated using the existing master cylinder hydraulic pressure detection sensor, so that the addition of a new member for the brake operation force detection sensor can be avoided.

In another aspect of the braking control device of the present invention, a depressing force detection sensor for detecting the depressing force applied to the brake pedal is provided as the brake operation force detection sensor.

According to this aspect, the depressing force is detected by a depressing force detection sensor and used as the brake operation force. The use of the depressing force detection sensor makes it possible for the assist hydraulic pressure control section to calculate the assist hydraulic pressure merely by establishing the first correlation and the second correlation in advance. Consequently, in order to calculate the assist hydraulic pressure, it is not necessary to establish a separate relationship for the first correlation and the second correlation, thereby simplifying the configuration.

DESCRIPTION OF THE PREFERRED
EMBODIMENTS

Embodiments of the braking control device according to the present invention are described based on the accompanying drawings.

First Embodiment

Figure 1:
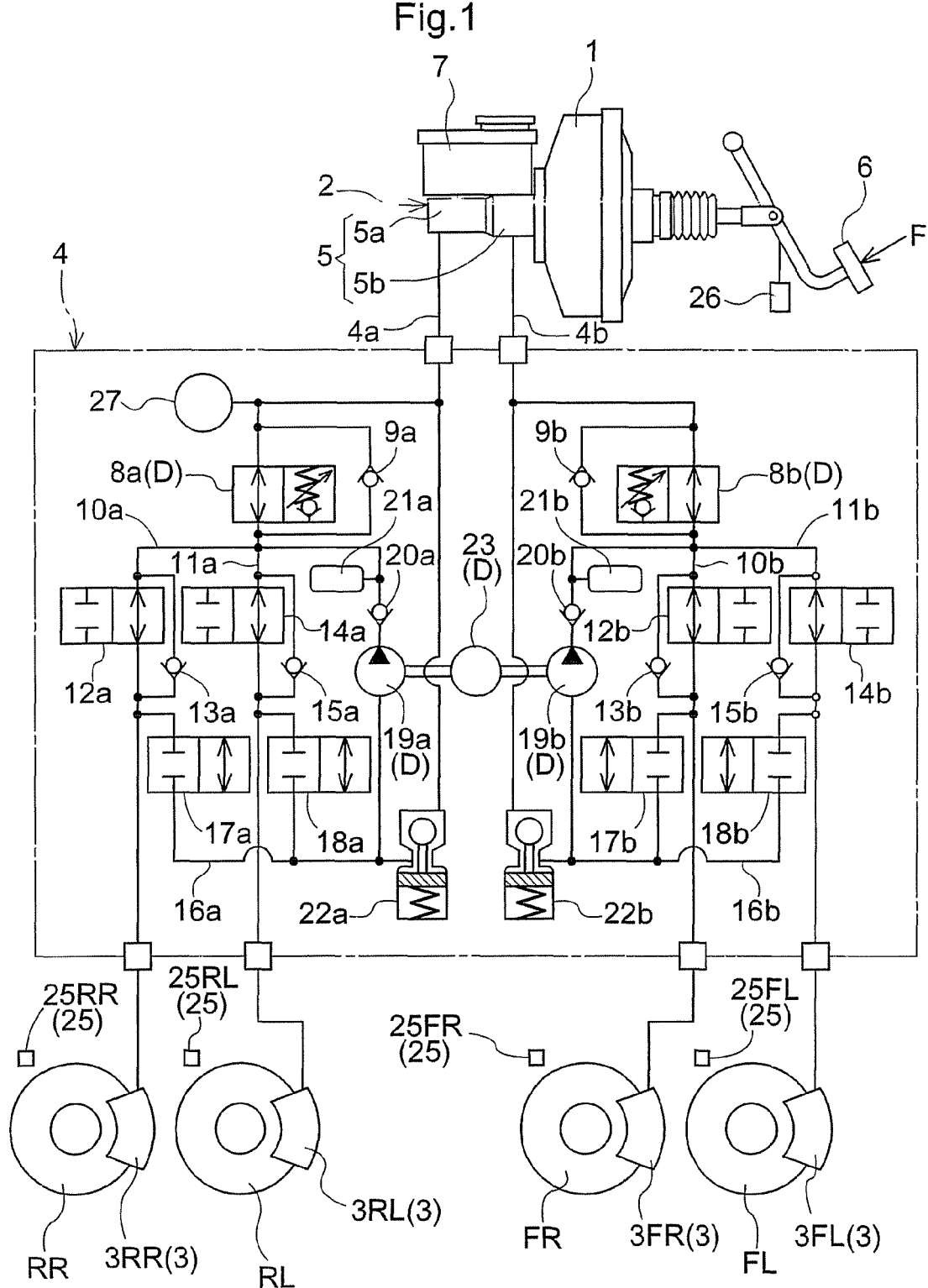
FIG. 1 is a schematic diagram showing a configuration of a braking control device.

The braking control device shown in FIG. 1 has a master cylinder 2 for generating a master cylinder hydraulic pressure by amplifying the brake operation force with a booster device 1 and a hydraulic circuit 4 for applying the master cylinder hydraulic pressure to a wheel cylinder 3 of each of the vehicle wheels.

Four vehicle wheels are provided; i.e., a front right wheel FR, front left wheel FL, right rear wheel RR, and left rear wheel RL. Wheel cylinders 3FR, 3FL, 3RR, and 3RL are provided to each of the vehicle wheels FR, FL, RR, and RL. A hydraulic circuit 4 is configured so that the master cylinder hydraulic pressure generated at the master cylinder 2 is applied to each of the wheel cylinders 3.

The master cylinder 2 is a tandem-type cylinder having two hydraulic pressure chambers 5. The master cylinder 2 generates a master cylinder hydraulic pressure in each of the two hydraulic pressure chambers 5. A master reservoir 7 is connectedly provided to each of the two hydraulic pressure cylinders 5 of the master cylinder 2. The master reservoir 7 supplies brake fluid to the master cylinder 2 and holds the excess brake fluid of the master cylinder 2.

The booster device 1 is configured with a vacuum booster that utilizes the negative vacuum pressure from an engine. The booster device 1 has two chambers (not shown) and is configured such that, when the brake operation force is applied via a brake pedal 6, one of the chambers is used as the atmospheric pressure chamber, and the other chamber is used as the negative pressure chamber produced utilizing the negative vacuum pressure from the engine. The booster device 1 is configured such that the piston rod from the master cylinder 2 is pressed by a force resulting from amplification of the brake operation force due to the pressure differential between the atmospheric pressure chamber and the negative pressure chamber.

The hydraulic circuit 4 comprises a first hydraulic circuit 4a produced by linking one of the hydraulic pressure chambers 5a of the master cylinder 2 with the wheel cylinder 3RR of the right-rear wheel RR and the wheel cylinder 3RL of the left-back wheel RL; and a second hydraulic circuit 4b produced by linking the other hydraulic pressure chamber 5b of the master cylinder 2 with the wheel cylinder 3FR of the right-front wheel FR and the wheel cylinder 3FL of the left-front wheel FL.

A relative pressure differential valve 8a that can switch between two positions of a communicating position and a differential pressure position is provided in the first hydraulic circuit 4a. The proportional differential pressure valve 8a is configured so that the hydraulic pressure on the side of the wheel cylinder 3 is higher than the hydraulic pressure on the side of the master cylinder 2, and so that a pressure differential is generated between the hydraulic pressure of the master cylinder 2 and the hydraulic pressure of the wheel cylinder 3. The proportional differential pressure valve 8a is configured so that the pressure differential between the hydraulic pressure on the side of the master cylinder 2 and the hydraulic pressure on the side of the wheel cylinder 3 can be adjusted by adjusting the aperture thereof in the pressure differential position. A pressure differential reverse check valve 9a that allows flow of brake fluid from the master cylinder 2 to the wheel cylinder 3, while preventing flow in the reverse direction, is provided in the stated order with respect to the proportional differential pressure valve 8a. The pressure differential reverse check valve 9a is designed so that brake fluid is allowed to flow from the master cylinder 2 to the wheel cylinder 3 even when the proportional differential pressure valve 8a is closed, and the master cylinder hydraulic pressure is applied to the wheel cylinder 3.

The first hydraulic circuit 4a branches into a first branch 10a and a second branch 11a to the side of the wheel cylinder 3 from the proportional differential pressure valve 8a, and the first branch 10a and second branch 11a connect with the wheel cylinders 3RR and 3RL, respectively. A first normally open control valve 12a that is normally open and can switch between a communicating position and a blocking position is provided on the first branch 10a. Parallel to the first normally open control valve 12a is provided a first reverse check valve 13a that allows brake fluid to flow from the side of the wheel cylinder 3 to the side of the master cylinder 2 but prevents flow in the reverse direction. As with the first branch 10a, a second normally-open control valve 14a corresponding to the first normally open control valve 10a and a second reverse check valve 15a corresponding to the first reverse check-valve 13a are provided on the second branch 11a.

There is provided a branch confluence path 16a that creates confluence between the flow path portion that branches from a location on the second branch 11a that is closer to the wheel cylinder 3 than the second normally-open control valve 14a, and the flow path portion that branches from a location on the first branch 10a that is closer to the wheel cylinder 3 than the first normally open control valve 12a. A first normally closed control valve 17a that is normally closed and is able to switch between a communicating position and a blocking position is provided in the flow channel portion that has branched from the first branch 10a in the branched confluence path 16a. In addition, a second normally-closed control valve 18a that is normally closed and is able to switch between a communicating position and a blocking position is provided in the flow channel portion that has branched from the second branch 11a. A hydraulic pressure pump 19a, a third reverse check valve 20a, and a damper 21a are provided in sequence in the confluence portion of the branch confluence path 16a, connecting between the proportional differential pressure valve 8a and the first normally open control valve 12a and the second normally-open control valve 14a in the first hydraulic circuit 4a. The hydraulic pressure pump 19a is rotatably driven by a motor 23 and is configured so as to pressurize and discharge brake fluid at a prescribed pressure. A reservoir 22a between the hydraulic pressure pump 19a and the first normally closed control valve 17a and a second normally-closed control valve 18a are provided in the branched confluence path 16a. The reservoir 22a is connected between the master cylinder 2 and the proportional differential pressure valve 8a in the first hydraulic circuit 4a.

A description was presented above concerning the configuration of the first hydraulic circuit 4a in the hydraulic circuit 4. A similar configuration is produced for the first hydraulic circuit 4a and second hydraulic circuit 4b, and the same members as in the first hydraulic circuit 4a are provided in the second hydraulic circuit 4b. In brief, the respective members such as the proportional differential pressure valve 8b, first normally open control valve 12b, second normally-open control valve 14b, first normally closed control valve 17b, second normally-closed control valve 18b, and hydraulic pressure pump 19b are provided in the second hydraulic circuit 4b. For the same members, the designation "a" is provided subsequent to the Arabic numerals assigned to the members provided in the first hydraulic circuit 4a, whereas the designation "b" is provided subsequent to the Arabic numerals assigned to the members provided in the second hydraulic circuit 4b.

When members provided both in the first hydraulic circuit 4a and second hydraulic circuit 4b are designated below, the suffixes "a" and "b" will be left off of the Arabic numerals.

The motor 23 is configured so that a single motor 23 rotatably drives the hydraulic pressure pump 19b provided on the second hydraulic circuit 4b and the hydraulic pressure pump 19a provided on the first hydraulic circuit 4a.

There are provided a vehicle wheel speed sensor 25 for detecting the wheel speed of the vehicle wheels, an operation state detection sensor 26 for detecting the depressing force applied to the brake pedal 6, and a hydraulic pressure sensor 27 for detecting the master cylinder hydraulic pressure. The vehicle wheel speed sensor 25 consists of a vehicle wheel speed sensor 25FR for the right-front wheel FR, a vehicle wheel speed sensor 25FL for the front-left wheel FL, a vehicle wheel speed sensor 25RR for the right-rear wheel RR, and a vehicle wheel speed sensor 25RL for the left-rear wheel RL, where the vehicle wheel speed sensor for each of the vehicle wheels is detected by each of the vehicle wheel speed sensors 25. In this embodiment, the hydraulic pressure sensor 27 is provided on the first hydraulic circuit 4a, but may also be provided on the second hydraulic circuit 4b.

Figure 2:
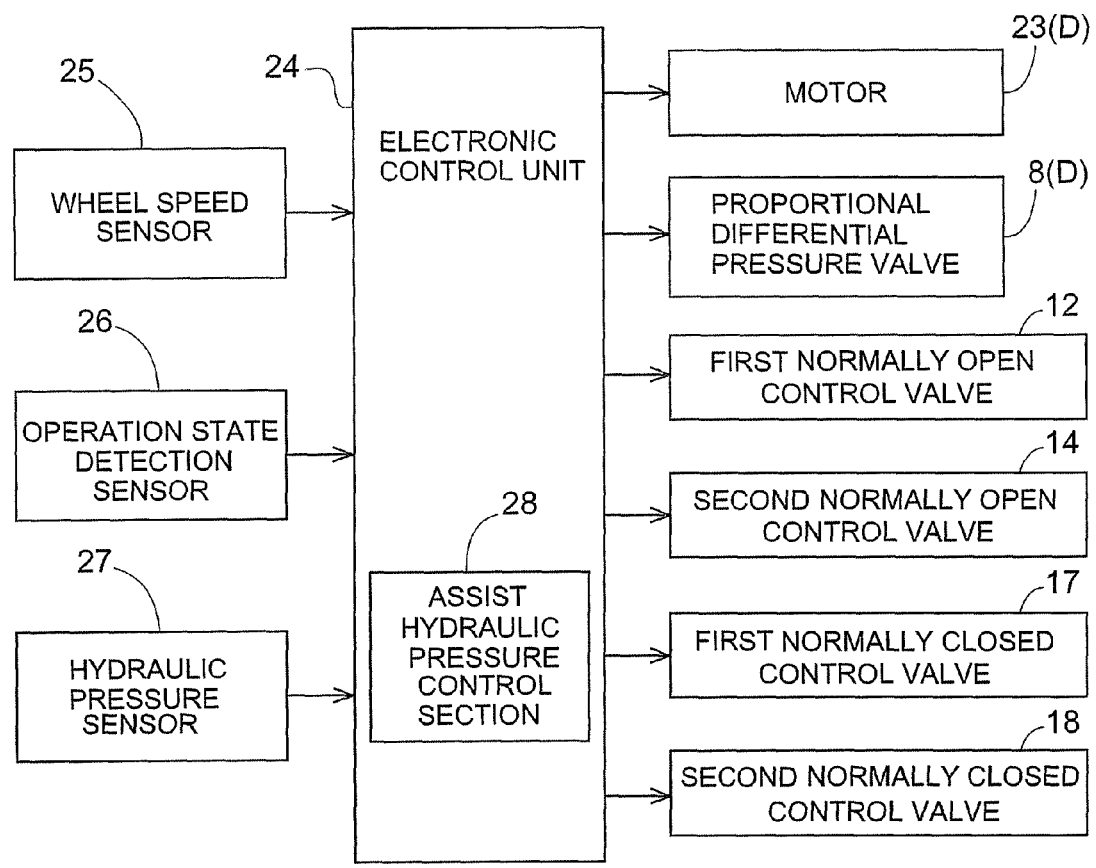
FIG. 2 is a block diagram showing control of the braking control device.

As shown in FIG. 2, a configuration is produced in which respective detection signals from the vehicle wheel speed sensor 25, the operation state detection sensor 26, and the hydraulic pressure sensor 27 are input to an electronic control unit 24. The electronic control unit 24 is configured with a microcomputer having a CPU, RON, RAM, and input/output parts. The electronic control unit 24 controls the respective operations of the proportional differential pressure valve 8, the first normally open control valve 12, the second normally-open control valve 14, the first normally closed control valve 17, the second normally-closed control valve 18, and the motor 23 based on the respective detection signals of the vehicle wheel speed sensor 25, the operation state detection sensor 26, and the hydraulic pressure sensor 27. A configuration is accordingly produced in which the wheel cylinder pressure applied to each wheel cylinder 3 is controlled.

A case will be described below as an example in which the wheel cylinder pressure applied to the wheel cylinder 3RR of the right-rear wheel RR is controlled.

When the wheel cylinder pressure is increasing, the electronic control unit 24 operates the hydraulic pressure pump 19a as a result of the operation of the motor 23, controls the proportional differential pressure valve 8a, and, as shown in FIG. 1, switches the first normally open control valve 12a to the communicating position and turns the first normally closed control valve 17a to the blocked position. When the wheel cylinder pressure is maintained, the electronic control unit 24 switches the first normally open control valve 12a to the blocked position and switches the first normally closed control valve 17a to the blocked position. When the wheel cylinder pressure is decreasing, the electronic control unit 24 switches the first normally open control valve 12a to the blocked position and switches the first normally closed control valve 17a to the communicating position.

The assist hydraulic pressure generation mechanism D for generating the assist hydraulic pressure that is added to the master cylinder hydraulic pressure in the hydraulic circuit 4 comprises a motor 23, a hydraulic pressure pump 19, and a proportional differential pressure valve 8; and the pressurization device is formed from a hydraulic pressure pump 19.

A configuration is produced in which the electronic control unit 24 switches the proportional differential pressure valve 8 to the pressure differential position when the hydraulic pressure pump 19 is in a state of being rotatably driven by the motor 23. The hydraulic pressure on the side of the wheel cylinder 3 is accordingly placed at a higher hydraulic pressure than the hydraulic pressure on the side of the master cylinder 2, whereby the assist hydraulic pressure is added to the master cylinder hydraulic pressure. A configuration is produced in which the magnitude of the assist hydraulic pressure can be adjusted by adjusting the aperture of the proportional differential pressure valve 8 that has been switched to the pressure differential position and the rotational rate of the hydraulic pressure pump 19.

Figure 3:
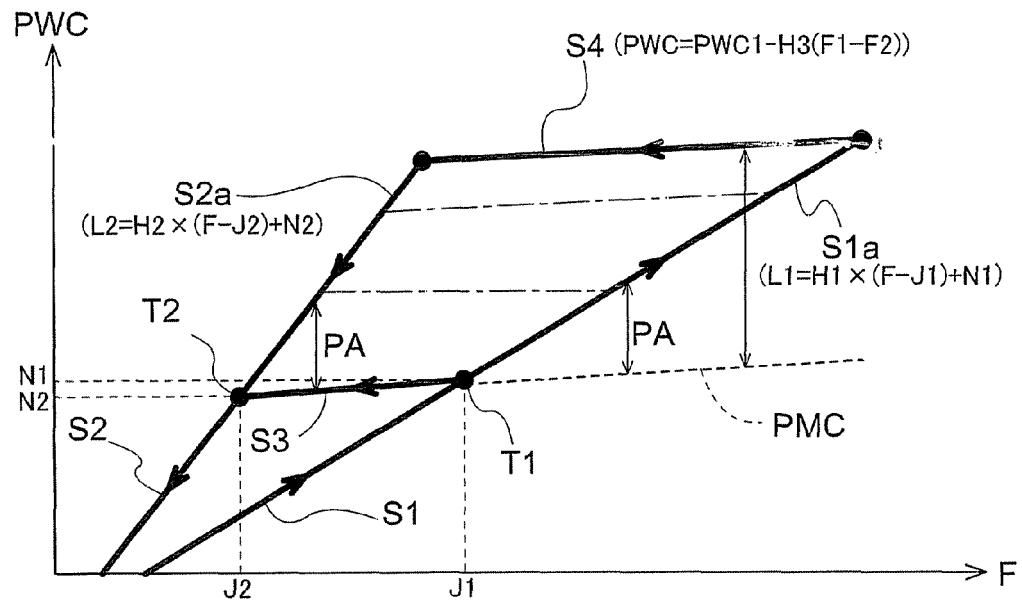
FIG. 3 is a graph showing a relationship between brake operation force and wheel cylinder pressure.

FIG. 3 shows the relationship between the brake operation force F and the wheel cylinder pressure PWC applied to the wheel cylinder 3. The change in the master cylinder hydraulic pressure PMC when a brake operation force that exceeds the boost limit point T1 is applied is represented by a dotted line in the drawing.

Herein, the boost limit point T1 is the limit point at which the booster device 1 cannot power the brake operation force at the prescribed boost ratio. For a brake operation force F that is below the boost limit point T1, a master cylinder hydraulic pressure is generated as a result of the force produced when the booster device 1 amplifies the brake operation force F by the prescribed boost ratio, and this master cylinder hydraulic pressure is applied to each of the wheel cylinders 3 as the wheel cylinder pressure.

The relationship between brake operation force and wheel cylinder pressure under the state in which assist hydraulic pressure is not added adheres to the first correlation S1 when the brake operation force is increasing, to the second correlation S2 after hysteresis is applied during decrease of brake operation force, and to the intermediate correlation S3 that links the first correlation S1 and second correlation S2. In this embodiment, a configuration is produced in which the intermediate correlation S3 is configured so that the wheel cylinder pressure decreases more gradually than in the first correlation S1.

The first correlation S1, second correlation S2, and intermediate correlation S3 are each set unambiguously in accordance with the characteristics of the booster device 1 and master cylinder 2.

A configuration is produced whereby, when the brake operation force F decreases during the first correlation S1, after the wheel cylinder pressure PWC decreases at the same slope as the slope of the amount of decrease in the wheel cylinder pressure PWC with respect to the amount of decrease in the brake operation force F in the intermediate correlation S3, the wheel cylinder pressure PWC then decreases based on the second correlation S2. A configuration is produced whereby, when the brake operation force F increases during the second correlation S2, after the wheel cylinder pressure PWC is held constant, the wheel cylinder pressure PWC then increases based on the first correlation S1.

The electronic control unit 24 includes an assist hydraulic pressure control section 28 that calculates the assist hydraulic pressure added to the master cylinder hydraulic pressure when a brake operation force that exceeds the boost limit point is applied, and adds the determined assist hydraulic pressure to the master cylinder hydraulic pressure.

When a brake operation force F that exceeds the boost limit point is applied, the assist hydraulic pressure control section 28 calculates the target wheel cylinder pressure PMC based on the brake operation force F and then calculates the assist hydraulic pressure PA corresponding to the deficiency in the master cylinder hydraulic pressure PMC with respect to the calculated wheel cylinder hydraulic pressure PMC. The assist hydraulic pressure control section 28 then controls the operation of the assist hydraulic pressure generation mechanism D so as to generate the calculated assist hydraulic pressure PA. The assist hydraulic pressure control section 28 rotatably drives the hydraulic pressure pump 19 with the motor 23, adjusts the rotational rate thereof, and generates the calculated assist hydraulic pressure PA by switching the proportional differential pressure valve 8 to the pressure differential position and controlling the aperture thereof. Incidentally, the assist hydraulic pressure control section 28 can also generate the calculated assist hydraulic pressure PA by switching the proportional differential pressure valve 8 to the pressure differential position and adjusting the aperture thereof with the hydraulic pressure pump 19 in a state of being rotationally driven at a constant rate of rotation.

The electronic control unit 24, for example, stores the boost limit pressure at the boost limit point T1 and detects the boost limit point T1 when the master cylinder hydraulic pressure PMC has reached this boost limit pressure. The assist hydraulic pressure control section 28 calculates the target wheel cylinder pressure and assist hydraulic pressure and generates the calculated assist hydraulic pressure after determining that a brake operation force that exceeds the boost limit point T1 is applied by detecting the boost limit point T1. When the assist hydraulic pressure control section 28 has determined that the calculated assist hydraulic pressure PA is zero and the assist termination point T2 has been reached, operation of the assist hydraulic pressure generation mechanism D is stopped and the application of assist hydraulic pressure is reduced to zero.

The assist hydraulic pressure PA will be described based on FIG. 3.

In FIG. 3, S1a denotes the first correlation extension section resulting from extension of the first correlation S1, and S2a denotes the second correlation extension section resulting from extension of the second correlation S2. In addition, there is a gradual correlation S4 that conjoins the first correlation extension section S1a and the second correlation extension section S2a. This embodiment is configured so that the gradual correlation S4 reduces the wheel cylinder pressure more gradually than in the first correlation extension section S1a.

When the brake operation force increases, the assist hydraulic pressure control section 28 controls the assist hydraulic pressure based on the first correlation extension section S1a. Thus, when the brake operation force increases, the assist hydraulic pressure control section 28 controls the assist hydraulic pressure so that the relationship between the brake operation force F and the wheel cylinder hydraulic pressure PWC adheres to the first correlation S1. When the brake operation force increases, regardless of whether the brake operation force exceeds or does not exceed the boost limit point T1, the relationship between the brake operation force F and the wheel cylinder pressure PWC is maintained at the first correlation S1. Consequently, the slope of the increase in the wheel cylinder pressure PWC can be held constant with respect to the increase in the brake operation force F before and after the assist hydraulic pressure is added, and the change in the deceleration rate can be controlled.

When the brake operation force decreases, the assist hydraulic pressure control section 28 controls the assist hydraulic pressure based on the gradual correlation S4 and then controls the assist hydraulic pressure based on the second correlation extension section S2a. Thus, when the brake operation force decreases, hysteresis is added so that the degree of change in the wheel cylinder pressure with respect to the degree of change in the brake operation force is smaller than when the brake operation force increases, and the correlation between the brake operation force F and the wheel cylinder pressure PWC is maintained in the second correlation S2 as the assist hydraulic pressure control section 28 controls the assist hydraulic pressure so that the assist hydraulic pressure is reduced, whereupon the assist hydraulic pressure is reduced to zero.

By adding hysteresis to the relationship between the brake operation force F and the wheel cylinder pressure PWC, it is possible to reduce the amount of decrease in the wheel cylinder pressure PWC with respect to the amount of decrease in the brake operation force F when the brake operation force F transitions from an increase to a decrease. Consequently, even when the brake operation force F transitions from an increase to a decrease due to fluctuation in the brake operation force F or another reason, the amount of change in the wheel cylinder pressure PWC can be minimized, making it possible to prevent the operator from experiencing a sensation of insufficient firmness with respect to changes in the brake operation force F. Moreover, when the brake operation force decreases, the relationship between the brake operation force F and the wheel cylinder pressure PWC adheres to the second correlation S2 prior to when the assist hydraulic pressure has been reduced to zero, and this second correlation S2 is then maintained while the assist hydraulic pressure is reduced to zero. The second correlation S2 is also maintained after the assist hydraulic pressure has been reduced to zero. Consequently, the slope of the decrease in the wheel cylinder pressure PWC with respect to the decrease in the brake operation force F does not change before or after the assist hydraulic pressure has been reduced to zero and can also be held constant even after the assist hydraulic pressure has been reduced to zero. As a result, there is no dramatic change in the slope of the decrease in the wheel cylinder pressure PWC with respect to the decrease in the brake operation force F, and any change in deceleration rate can be reliably minimized.

In addition, the slope of the amount of decrease in the wheel cylinder pressure PWC with respect the amount of decrease in the brake operation force F in the gradual correlation S4 is set to be the same as the slope of the amount of decrease in the wheel cylinder pressure PWC with respect to the amount of decrease in the brake operation force F in the intermediate correlation S3. the relationship between the decrease in the wheel cylinder pressure PWC with respect to the decrease in the brake operation force F having the hysteresis applied by the assist hydraulic pressure control section 28 is thus set to the same relationship described above for the hysteresis applied when the brake operation force F does not exceed the boost limit point T1. The relationship between the decrease in wheel cylinder pressure with respect to the decrease in brake operation force having hysteresis is thus the same relationship regardless of whether or not the brake operation force exceeds or does not exceed the boost limit point. Consequently, regardless of whether a brake operation force that exceeds or does not exceed the boost limit point is applied, it is possible to provide the operator with the same sensation of deceleration with respect to the brake operation force.

The calculation of the assist hydraulic pressure PA is described below.

The assist hydraulic pressure control section 28 calculates the target the wheel cylinder pressure PWC based on the brake operation force F. The assist hydraulic pressure control section 28 calculates the target the wheel cylinder pressure PWC so that, when the brake operation force increases, the wheel cylinder pressure PWC increases based on the first correlation extension section S1a, and, when the brake operation force decreases, the wheel cylinder pressure PWC decreases based on the second correlation extension section S2a after the wheel cylinder pressure PWC has decreased based on the gradual correlation S4.

When the brake operation force F decreases during the first correlation extension section S1a, as indicated by the dotted line in FIG. 3, the assist hydraulic pressure control section 28 calculates the target wheel cylinder pressure PWC so that the wheel cylinder pressure PWC decreases based on the second correlation S2, after the wheel cylinder pressure PWC has decreased at the same slope as the slope for the amount of decrease in the wheel cylinder pressure PWC with respect to the amount of decrease in the braking manipulation amount F in the gradual correlation S4. In addition, when the brake operation force F increases during the second correlation extension section S2a, the target wheel cylinder pressure PWC is calculated so that the wheel cylinder pressure PWC is held constant, and the wheel cylinder pressure PWC is then increased based on the first correlation extension section S1a.

When the assist hydraulic pressure control section 28 calculates the target wheel cylinder pressure PWC, the assist hydraulic pressure PA is thus calculated in accordance with the difference between the calculated the wheel cylinder pressure PWC and the master cylinder hydraulic pressure PMC.

In this embodiment, a master cylinder hydraulic pressure detection sensor that detects the master cylinder hydraulic pressure based on the brake operation force F is provided as the brake operation force detection sensor for detecting the brake operation force F. This master cylinder hydraulic pressure detection sensor comprises a hydraulic pressure sensor 27.

Figure 4:
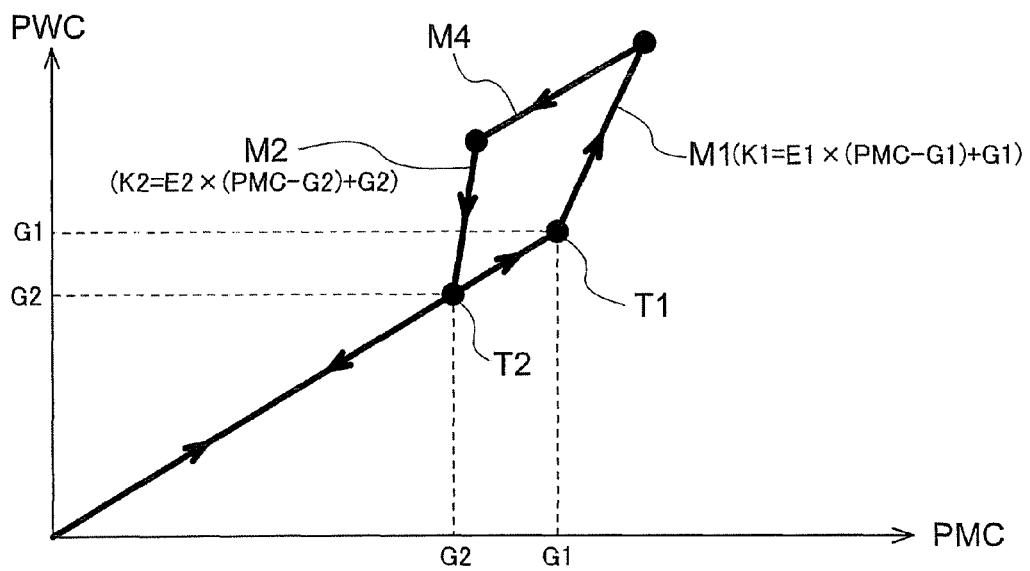
FIG. 4 is a graph showing a relationship between master cylinder hydraulic pressure and wheel cylinder pressure.

Thus, for calculation of the target the wheel cylinder pressure PWC when an assist hydraulic pressure is to be added, the assist hydraulic pressure control section 28 calculates the target wheel cylinder pressure PWC for each of the correlations between the master cylinder hydraulic pressure PMC and the wheel cylinder pressure PWC corresponding to the first correlation extension section, gradual correlation, and second correlation extension section, based on the detected information from the hydraulic pressure sensor 27, as shown in FIG. 4.

In FIG. 4, the first map M1 corresponds to the first correlation extension section S1a, the second map M2 corresponds to the second correlation extension section S2a, and the gradual map M4 corresponds to the gradual correlation S4. The slope of the gradual map M4 is set so as to produce the same slope as the slope of the correlation between the master cylinder hydraulic pressure PMC and the wheel cylinder pressure PWC in the areas other than the first map M1 and second map M2.

The assist hydraulic pressure control section 28 calculates the target wheel cylinder pressure PWC so that the wheel cylinder pressure PWC increases based on the first map M1 when the master cylinder hydraulic pressure PMC increases and so that the wheel cylinder pressure PWC decreases based on the gradual map M4 and then decreases based on the second map M2 when the master cylinder hydraulic pressure PMC decreases.

The assist hydraulic pressure control section 28 is configured so that calculation of the wheel cylinder pressure PWC and the assist hydraulic pressure PA is repeatedly carried out at a prescribed interval. A description is presented below based on the flow chart of FIG. 5.

The assist hydraulic pressure control section 28 acquires the master cylinder hydraulic pressure PMC from the detection signal of the hydraulic pressure sensor 27 and calculates a first map calculated value K1 and a second map calculated value K2 based on the acquired master cylinder hydraulic pressure PMC (steps 1 and 2).

In FIG. 4, the first map calculated value K1 is the wheel cylinder pressure on the first map M1 calculated from the master cylinder hydraulic pressure PMC. The second map calculated value K2 is the wheel cylinder pressure on the second map M2 calculated form the master cylinder hydraulic pressure PMC.

Regarding the first map calculated value K1, the assist hydraulic pressure control section 28 uses the numerical formula 1 below to calculate the first map calculated value K1 from the master cylinder hydraulic pressure PMC, the first map slope E1 of the first map M1, and the boost limit pressure G1 at the boost limit point T1. The assist hydraulic pressure control section 28 stores the first map slope E1 and the boost limit pressure G1. The first map slope E1, in FIG. 3, is a value determined by dividing the first slope of the first correlation S1 by the slope of the correlation between the brake operation force F and the master cylinder hydraulic pressure PMC when the brake operation force F that exceeds the boost limit point T1 is applied (slope of the dotted line in FIG. 3).

$$K1 = E1 \times (PMC - G1) + G1 \qquad \text{[Numerical formula 1]}$$

K1 is the first map calculated value, E1 is the slope of the first map, PMC is the master cylinder hydraulic pressure, and G1 is the boost limit pressure.

Regarding the second map calculated value K2, the assist hydraulic pressure control section 28 uses the numerical formula 2 below to calculate the second map calculated value K2 from the master cylinder hydraulic pressure PMC, the second map slope E2 from the second map M2, and the assist end pressure G2 at the assist end point T2. The assist hydraulic pressure control section 28 stores the second map slope E2 and the assist end pressure G2. The second map slope E2, in FIG. 3, is a value determined by dividing the second slope of the second correlation S2 by the slope of the correlation between the brake operation force F and the master cylinder hydraulic pressure PMC when the brake operation force F that exceeds the boost limit point T1 is applied (slope of the dotted line in FIG. 3).

$$K2 = E2 \times (PMC - G2) + G2 \qquad \text{[Numerical formula 2]}$$

K2 is the second map calculated value, E2 is the slope of the second map, PMC is the master cylinder hydraulic pressure, and G2 is the assist end pressure.

Figure 5:
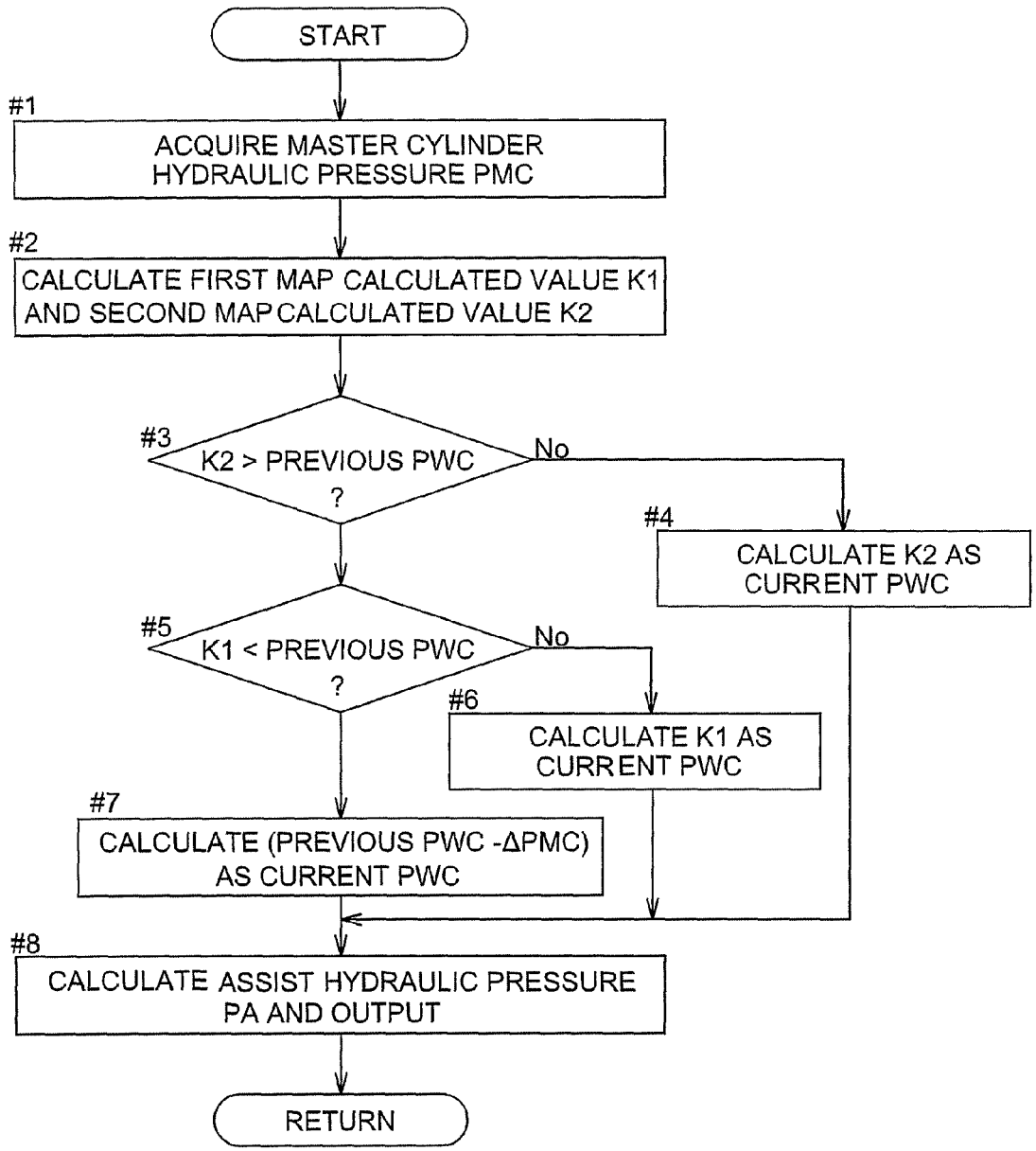
FIG. 5 is a flow chart showing an operation for calculating assist hydraulic pressure in the first embodiment.

Returning to the flow chart of FIG. 5, when the second map calculated value K2 is at or below the previously calculated wheel cylinder pressure (previous PWC), the assist hydraulic pressure control section 28 causes the wheel cylinder pressure PWC to decrease based on the second map M2, and the second map calculated value K2 is calculated as the current wheel cylinder pressure (current PWC; steps 3 and 4).

When the first map calculated value K1 is at or above the previously calculated wheel cylinder pressure (previous PWC), the assist hydraulic pressure control section 28 increases the wheel cylinder pressure PWC based on the first map M1, and the first map calculated value K1 is calculated as the current wheel cylinder pressure (current PWC; steps 5 and 6).

When the second map calculated value K2 is greater than the previously calculated wheel cylinder pressure (previous PWC), and when the first map calculated value K1 is smaller than the previously calculated wheel cylinder pressure (previous PWC), the assist hydraulic pressure control section 28 causes the wheel cylinder pressure PWC to decrease based on the gradual map M4, and a value determined by subtracting only the change ΔPMC of the master cylinder hydraulic pressure PMC from the previously calculated wheel cylinder pressure (previous PWC) is calculated as the current wheel cylinder pressure (current PWC; step 7).

When the assist hydraulic pressure control section 28 calculates the current wheel cylinder pressure (current PWC), the assist hydraulic pressure PA is thus calculated from the difference in the current calculated wheel cylinder pressure (current PWC) and the master cylinder hydraulic pressure PMC, and the calculated assist hydraulic pressure is output (step 8).

Second Embodiment

The second embodiment is another embodiment of a configuration for calculating the assist hydraulic pressure PA in the first embodiment described above. Other constituent components are similar to the first embodiment described above, and descriptions have been omitted.

A depressing force detection sensor for detecting the depressing force applied to the brake pedal 6 is provided as the brake operation force detection sensor for detecting the brake operation force. This depressing force detection sensor is composed of an operation state detection sensor 26. The depressing force detected by the operation state detection sensor 26 can be directly used as the brake operation force F. Thus, as regards the calculation of the wheel cylinder pressure PWC, as shown in FIG. 3, the assist hydraulic pressure control section 28 calculates the target wheel cylinder pressure PWC from the first correlation extension section S1a, the gradual correlation S4, and the second correlation extension section S2a, based on the detected information from the operation state detection sensor 26.

Figure 6:
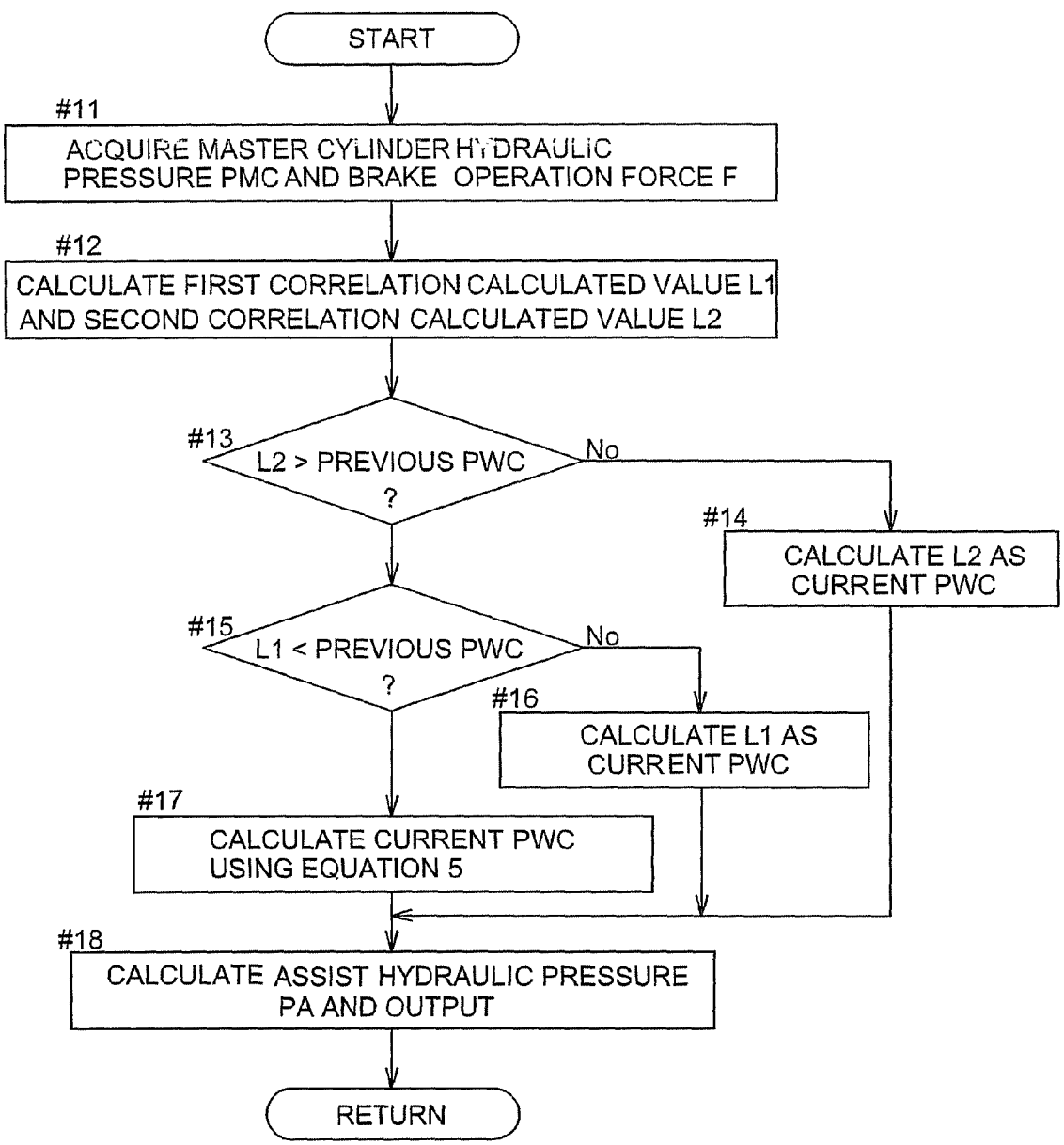
FIG. 6 is a flow chart showing an operation for calculating assist hydraulic pressure in the second embodiment.
Figure 7:
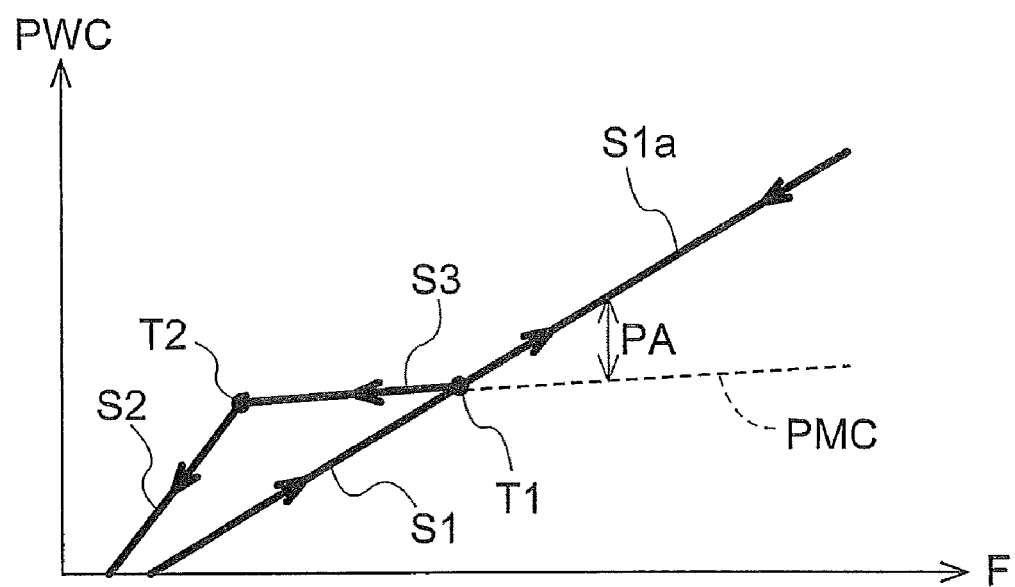
FIG. 7 is a graph showing a relationship between brake operation force and wheel cylinder pressure in a conventional braking control device.

A description is presented based on the flow chart of FIG. 6.

The assist hydraulic pressure control section 28 acquires the brake operation force F from the detection signal of the operation state detection sensor 26 as well as the master cylinder hydraulic pressure PMC from the detection signal of the hydraulic pressure sensor 27, and calculates the first correlation calculated value L1 and second correlation calculated value L2 based on the acquired brake operation force F (steps 11, 12).

In FIG. 3, the first correlation calculated value L1 is the wheel cylinder pressure in the first correlation extension section S1a calculated from the brake operation force F. The second correlation calculated value L2 is the wheel cylinder pressure in the second correlation extension section S2a calculated from the brake operation force F.

Regarding the first correlation calculated value L1, the assist hydraulic pressure control section 28 uses the numerical formula 3 below to calculate the first correlation calculated value L1 from the brake operation force F, the first correlation slope H1 of the first correlation extension section S1a, the boost limit brake operation force J1 at the boost limit point T1, and the boost limit pressure N1 at the boost limit point T1. The assist hydraulic pressure control section 28 stores the first slope H1 and the boost limit brake operation force J1.

$$L1 = H1 \times (F - J1) + N1 \qquad \text{[Numerical formula 3]}$$

L1 is the first correlation calculated value, H1 is the first correlation slope, F is the brake operation force, J1 is the boost limit brake operation force, and N1 is the boost limit pressure.

For the second correlation calculated value L2, the assist hydraulic pressure control section 28 uses the numerical formula 4 below to calculate the second correlation calculated value L2 from the brake operation force F, the second correlation slope H2 of the second correlation extension section S2a, the assist termination brake operation force J2 at the assist termination point T2 and the assist termination pressure N2 at the assist termination point T2. The assist hydraulic pressure control section 28 stores the second correlation slope H2 and the assist termination brake operation force J2.

$$L2 = H2 \times (F - J2) + N2 \qquad \text{[Numerical formula 4]}$$

L2 is the second correlation calculated value, H2 is the second correlation slope, F is the brake operation force, J2 is the assist termination brake operation force, and N2 is the assist termination pressure.

Returning to the flow chart of FIG. 6, the assist hydraulic pressure control section 28 causes the wheel cylinder pressure PWC to decrease based on the second correlation extension section S2a when the second correlation calculated value L2 is equal to or less than the previously calculated wheel cylinder pressure (previous PWC) and calculates the second correlation calculated value L2 as the current wheel cylinder pressure (current PWC) (steps 13, 14).

The assist hydraulic pressure control section 28 increases the wheel cylinder pressure PWC based on the first correlation extension section S1a when the first correlation calculated value L1 is equal to or greater than the previous calculated wheel cylinder pressure (previous PWC), and calculates the first correlation calculated value L1 as the current wheel cylinder pressure (current PWC) (steps 15, 16).

The assist hydraulic pressure control section 28 causes the wheel cylinder pressure PWC to decrease based on the gradual correlation S4 when the second correlation calculated value L2 is greater than the previous calculated wheel cylinder pressure (previous PWC) and the first correlation calculated value L1 is smaller than the previously calculated wheel cylinder pressure (previous PWC), and uses numerical formula 5 to calculate the current wheel cylinder pressure (current PWC) below from the previous calculated wheel cylinder pressure (previous PWC), the gradual correlation slope H3 of the gradual correlation S4, the current acquired brake operation force (current brake operation force), and the previously acquired brake operation force (previous brake operation force) (step 17).

$$PWC = PWC1 - H3 \times (F1 - F2) \quad \text{[Numerical formula 5]}$$

PWC is the current wheel cylinder pressure, PWC1 is the previous calculated wheel cylinder pressure, H3 is the gradual correlation slope, F1 is the previously acquired brake operation force, and F2 is the current acquired brake operation force.

When the assist hydraulic pressure control section 28 calculates the current wheel cylinder pressure (current PWC) in this manner, it calculates the assist hydraulic pressure PA from the difference between the current calculated wheel cylinder pressure (current PWC) and the master cylinder hydraulic pressure PMC and outputs the assist hydraulic pressure that has been calculated (step 18).

Additional Embodiment (1) In the first and second embodiments described above, the slope of the amount of decrease in the wheel cylinder pressure PWC with respect to the amount of decrease of the brake operation force F in the gradual correlation S4 can be set to a slope that is different from the slope of the amount of decrease of the wheel cylinder pressure PWC with respect to the amount of decrease of the brake operation force F in the intermediate correlation S3.

The gradual correlation S4 may be configured so that the wheel cylinder pressure is held constant, regardless of the decrease in the brake operation force F.

(2) In the first and second embodiments described above, the slope of the amount of decrease of the wheel cylinder pressure PWC with respect to the amount of decrease in the brake operation force F in the gradual correlation S4 can be set so as to produce a straight line, but may also be set so as to produce a curve.

(3) In the second embodiment above, the operation state detection sensor 26 may have a configuration in which the manipulation amount of the brake pedal 6 is detected, instead of a configuration in which the depressing force applied to the brake pedal 6 is detected. The wheel cylinder pressure and assist hydraulic pressure can be calculated with the manipulated amount of the brake pedal 6 detected by the operation state detection sensor 26 as corresponding to the brake operation force F.

(4) In the first and second embodiments described above, the hydraulic circuit 4 can be configured so that, for example, the master cylinder hydraulic pressure is applied to the wheel cylinders 3FR and 3RL of the front-right wheel FR and left-rear wheel RL by the first hydraulic circuit 4a, and so that the master cylinder hydraulic pressure is applied to the wheel cylinders 3FL and 3RR provided on the front-left wheel FL and right-rear wheel RR by the second hydraulic circuit 4b. In other words, the configuration may be changed appropriately in regard to which wheel cylinders are subjected to the master cylinder hydraulic pressure in the hydraulic circuit 4.

The present invention has an assist hydraulic pressure control section for adding an assist hydraulic pressure to a master cylinder hydraulic pressure on the application of a brake operation force that exceeds a boost limit point at which a booster device can no longer amplify the brake operation force at the prescribed boost ratio. The present invention may be adapted to various types of braking control devices whereby, when a brake operation force that exceeds the boost limit point is applied, it is possible to minimize dramatic variation in a deceleration rate and to minimize any sensation of insufficient firmness with respect to a change in the brake operation force.

What is claimed is:

1. A braking control device comprising:
    a brake operation force detection unit for detecting a brake operation force;
    a master cylinder for amplifying the brake operation force by using a booster device, and generating a master cylinder hydraulic pressure;
    a hydraulic circuit for applying the master cylinder hydraulic pressure to a wheel cylinder of each vehicle wheel;
    a determination unit for determining whether or not the brake operation force exceeds a boost limit brake operation force with which the booster device becomes unable to amplify the brake operation force at a predetermined boost ratio;
    an assist hydraulic pressure generation unit for generating an assist hydraulic pressure which is disposed on the hydraulic circuit; and
    an assist hydraulic pressure control unit
        for calculating the assist hydraulic pressure based on detected information from the brake operation force detection unit, for generating a calculated assist hydraulic pressure by driving the assist hydraulic pressure unit and for adding the assist hydraulic pressure to the wheel cylinder in addition to the master cylinder hydraulic pressure, when the determination unit determines that the detected brake operation force exceeds the boost limit brake operation force; and
        for adding the master cylinder hydraulic pressure to the wheel cylinder without driving the assist hydraulic pressure generation unit, when the determination unit determines that the detected brake operation force does not exceed the boost limit brake operation force;
    the wheel cylinder being provided with a wheel cylinder pressure based on a predetermined correlation between the wheel cylinder pressure and the brake operation force and on detected brake operation force,
    wherein the correlation comprises:
    a first correlation representing a relationship between the brake operation force and the wheel cylinder pressure while the brake operation force is increasing within a range below the boost limit brake operation force,
    a second correlation representing a relationship between the brake operation force and the wheel cylinder pressure while the brake operation force is decreasing within a range below the brake operation force in which hysteresis is applied to the boost limit brake operation force, the second correlation being obtained by applying hysteresis to the first correlation at the time of a decrease in the brake operation force, a third correlation representing a relationship between the brake operation force and the wheel cylinder pressure while the brake operation force is increasing within a range above the boost limit brake operation force, and a fourth correlation representing a relationship between the brake operation force and the wheel cylinder pressure while the brake operation force is decreasing within the range above the brake operation force in which hysteresis is applied to the boost limit brake operation force, the fourth correlation being obtained by applying hysteresis to the third correlation at the time of a decrease in the brake operation force, the fourth correlation matching an extended portion of a line showing the second correlation in a diagram of the relationship between the brake operation force and the wheel cylinder pressure.

2. The braking control device according to claim 1, wherein the third correlation matches an extended portion of a line showing the first correlation in the diagram of the relationship between the brake operation force and the wheel cylinder pressure.

3. The braking control device according to claim 1, wherein, in the diagram of the relationship between the brake operation force and the wheel cylinder pressure, a slope of a decrease in the wheel cylinder pressure with respect to a decrease in the brake operation force of the hysteresis applied to the third correlation for obtaining the fourth correlation is equivalent to a slope of the decrease in the wheel cylinder pressure with respect to the decrease in the brake operation force of the hysteresis applied to the boost limit brake operation force when the determination unit determines that the detected brake operation force does not exceed the boost limit brake operation force.

4. The braking control device according to claim 1, wherein a master cylinder hydraulic pressure detection sensor for detecting the master cylinder hydraulic pressure based on the brake operation force is provided as the brake operation force detection unit.

5. The braking control device according to claim 1, wherein a depressing force detection sensor for detecting the depressing force applied to the brake pedal is provided as the brake operation force detection unit.

* * * * *